Sept. 1, 1970 M. BOLLÉ ET AL 3,526,449
ONE-PIECE SUNGLASSES
Filed Nov. 9, 1967

INVENTORS
MAURICE BOLLÉ
ROBERT BOLLÉ
BY RITCHARD SALVAGE

Howard Myles Schwinger
ATTORNEY

United States Patent Office 3,526,449
Patented Sept. 1, 1970

3,526,449
ONE-PIECE SUNGLASSES
Maurice Bollé and Robert Bollé, Oyonnax, France, and Ritchard Salvage, Brooklyn, N.Y., assignors to Ritchard Salvage
Filed Nov. 9, 1967, Ser. No. 681,762
Int. Cl. G02c 7/10
U.S. Cl. 351—41                    1 Claim

ABSTRACT OF THE DISCLOSURE

Sunglasses are of one-piece molded construction and have temple portions which are concavo-convex where they join the lens portions, thereby conforming to the optical curve of the lenses. An inwardly projecting lip is provided along the upper and lower edges of the lenses and bridge portions and is most pronounced along the underside of the bridge.

---

It is amongst the objects of the present invention to provide a one-piece pair of sunglasses wherein the heretofore separate component parts are formed integrally with one another while maintaining good optical quality.

Figure 1:
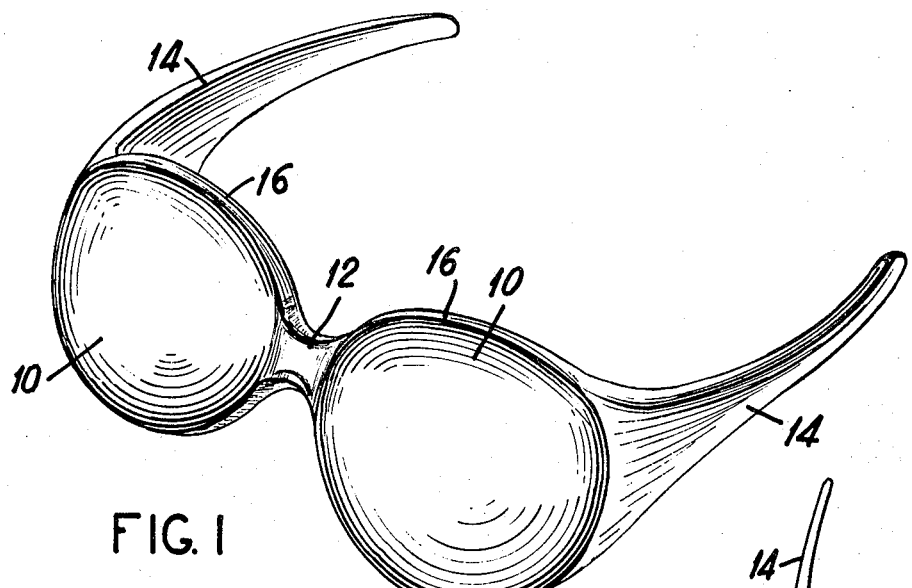
Figure 2:
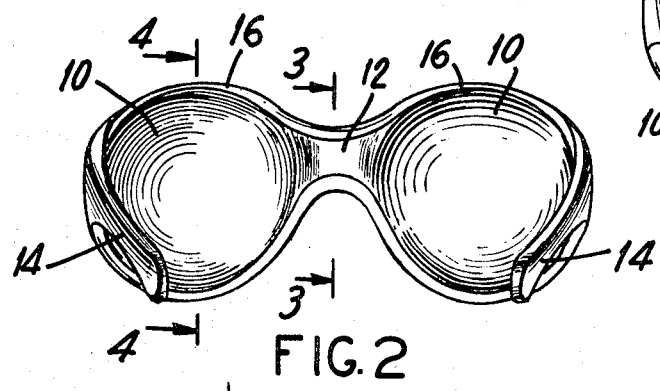
Figure 3:
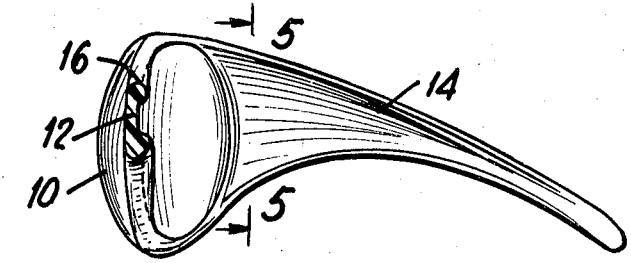
Figure 4:
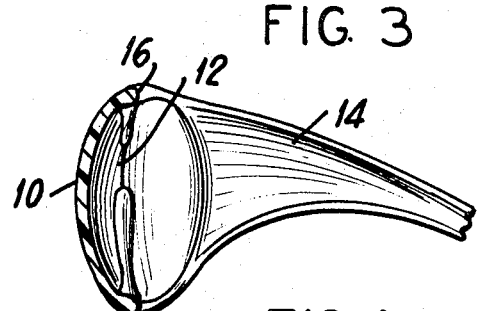
Figure 6:
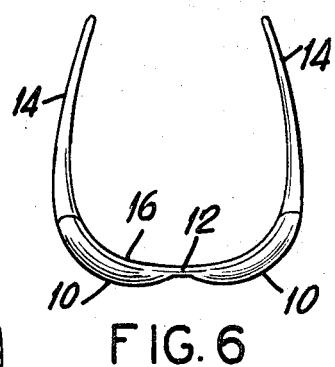
Figure 5:

How these and other objects are accomplished and new results are obtained will be apparent from what is described in the following specification, particularly pointed out in the claim, and illustrated in the accompanying drawing in which:

FIG. 1 is a perspective view of a pair of sunglasses in accordance with the present invention, FIG. 2 is a rear view of the sunglasses of FIG. 1, FIG. 3 is a sectional view taken on line 3—3 of FIG. 2, in the direction of the arrows, FIG. 4 is a sectional view taken on line 4—4 of FIG. 2, in the direction of the arrows, FIG. 5 is a sectional view taken on line 5—5 of FIG. 3, in the direction of the arrows, and FIG. 6 is a top view of the glasses of FIG. 1.

In FIG. 1 there is shown a pair of sunglasses in accordance with the present invention. The sunglasses are one piece and are formed by molding. The glasses consist of two relatively large oval lenses 10 separated by a stout bridge 12 shaped to accommodate the nose of the wearer. The lenses are dimensioned to extend from above the eyebrow to the cheekbones of the wearer and are rigid. The lenses are concavo-convex and terminate laterally in elongated rearward extensions 14 of diminishing width. The extensions constitute the temples of the glasses. The temples are resilient and may be readily flexed and thereby adjusted to the head of the wearer. The base portion of each temple is also concavo-convex conforming to the optical curve of the lenses. This may be best seen in FIG. 5.

It may be seen in FIG. 6 that the lenses and temples follow a smooth continuous curve and curve about the head of the wearer. This construction produces desirable optical benefits along with the concavo-convex configuration of the temple base. A lip 16 which extends inwardly of the glasses, runs along the upper and lower edges of the lenses and bridge and is most pronounced in the vicinity of the underside of the bridge.

Although the invention has been described in detail with respect to one preferred embodiment thereof, it will be understood by those skilled in the art, after reading this specification, that various changes and modifications may be made without departing from the spirit of the invention and the scope of the appended claim.

What is claimed is:

1. A one-piece pair of sunglasses wherein lenses and frame are integral, said sunglasses being entirely of molded plastic composition and having formed therein two relatively large, rigid, concavo-convex lenses separated by a stout bridge, each lens a flexible rearward extension of diminishing width, said extensions forming the temples of the sunglasses, the base portions of said temples being concavo-convex and conforming the optical curve of the lenses, the pair of sunglasses in top and bottom profile following a continuous curve so as to wrap around the face of the wearer and an inwardly projecting lip extending across the upper and lower edges of the lenses and bridge, said lip being most pronounced in the vicinity of the underside of the bridge.

References Cited

UNITED STATES PATENTS

| D. 212,261 | 9/1968 | Bolle et al. |
| 2,179,286 | 11/1939 | English _____ 351—49 X |
| 2,296,634 | 3/1942 | Fink. |

FOREIGN PATENTS 801,980   5/1936   France.

DAVID SCHONBERG, Primary Examiner

J. W. LEONARD, Assistant Examiner

U.S. Cl. X.R.
2—14; 351—44, 111